United States Patent [19]

Mori

[11] Patent Number: 5,423,111
[45] Date of Patent: Jun. 13, 1995

[54] MAGNETIC DISK TESTER

[75] Inventor: Kyoichi Mori, Hiratsuka, Japan

[73] Assignee: Hitachi Electronics Engineering Co., Ltd., Tokyo, Japan

[21] Appl. No.: 110,787

[22] Filed: Aug. 23, 1993

[30] Foreign Application Priority Data

Sep. 22, 1992 [JP] Japan .................................. 4-278118

[51] Int. Cl.6 ........................ B24B 39/06; B24B 49/00; B24B 51/00
[52] U.S. Cl. ........................................ 29/90.01; 82/1.12
[58] Field of Search ........................ 29/90.01; 82/1.12

[56] References Cited

U.S. PATENT DOCUMENTS 4,845,816  7/1989  Nams ................................. 29/90.01
5,018,257  5/1991  Nagashima et al. ............... 29/90.01

FOREIGN PATENT DOCUMENTS 62-103581  5/1987  Japan .
63-175278  7/1988  Japan .

OTHER PUBLICATIONS

ProQuip, Inc., "150 Series Media Test Systems".
ProQuip, Inc., The ProQuip PQ 5802A "Burnisher and Glide Tester".

Primary Examiner—William E. Terrell
Attorney, Agent, or Firm—Fay, Sharpe, Beall, Fagan, Minnich & McKee

[57] ABSTRACT

A magnetic disk tester according to the present invention comprises a first head moving mechanism for fixedly mounting a first certification testing head and a burnishing head perpendicularly of a moving direction thereof and a second head moving mechanism for fixedly mounting a second certification testing head and a glide testing head perpendicularly of a moving direction thereof. The burnishing head and the glide testing head are switched by the first certification testing head and the second certification testing head, respectively, by moving a spindle in an orthogonal direction to the head moving direction.

8 Claims, 5 Drawing Sheets

MAGNETIC DISK TESTER

TECHNICAL FIELD

The present invention relates to a magnetic disk tester capable of testing a magnetic disk having high density recording efficiently.

BACKGROUND ART

A hard disk device (HDD) which is one of external memories of a computer utilizes a magnetic disk as its recording medium. The magnetic disk is composed of a circular disc of aluminum or glass, a magnetic film formed by painting a surface thereof with magnetic material and a protective coating formed on the magnetic film. The surface of the magnetic disk should be as flat as possible and its recording performance or magnetic performance should be as good as possible. The flatness of magnetic disk is tested by means of a glide tester and the recording performance is tested by means of a certifier.

Figure 3:
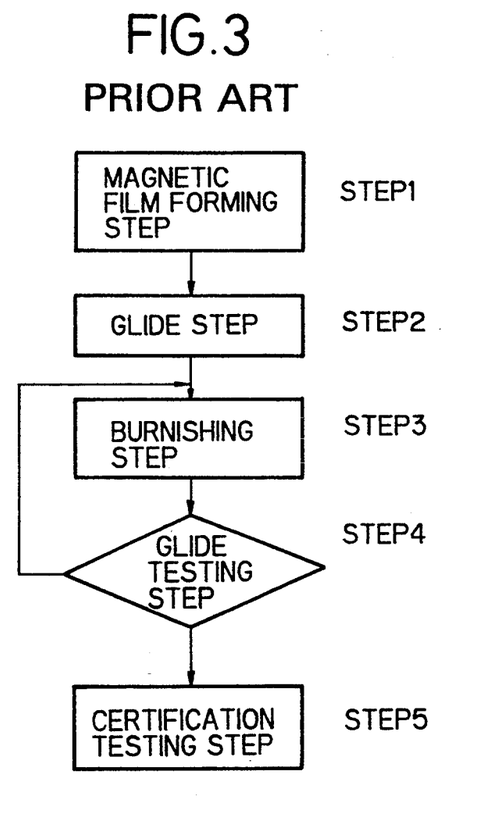
FIG. 3 is a flowchart of conventional manufacturing and testing steps of a magnetic disk.

FIG. 3 is a schematic flowchart of a conventional manufacturing and testing process of a magnetic disk. In the magnetic film forming step 1, a magnetic film and a protective coating are applied onto a surface of a disc of such as aluminum, followed by the glide step 2 in which a surface of the magnetic disk is polished to improve surface asperity thereof. Even after the glide step 2, there may be some residual asperity of the disk surface in the form of protrusions. Such protrusions are usually removed in the burnishing step 3 by rotating the magnetic disk while flying a burnishing head above the surface of the magnetic disk with a minute gap. The number of protrusions still existing on the magnetic disk surface even after the burnishing step 3 is detected by a glide test head in the glide testing step 4. When it is found in the glide testing step 4 that there are residual protrusions the number of which exceeds a predetermined number, the process is returned to the burnishing step 3. This is repeated until the number of residual protrusions becomes smaller than the predetermined number.

On the other hand, when the result in the glide testing step 4 is favorable, the magnetic disk is shifted to the certification testing step 5 in which the magnetic performance of the disk is tested by a certification testing head to certify the quality of the magnetic disk.

It has been known that minute particles of disk material may be scattered in the glide step 2 and contaminate environment. Therefore, it is conventional to separate a room in which the glide step 2 is performed from a room in which the burnishing step 3 and the glide testing step 4 are performed. The steps 3 and 4 are performed by means of a single testing device provided in the latter room. Further, the certification testing step 5 is performed in a still another room by means of a certifier since there is a possibility of scattering of particles in the burnishing step 3.

Figure 4:
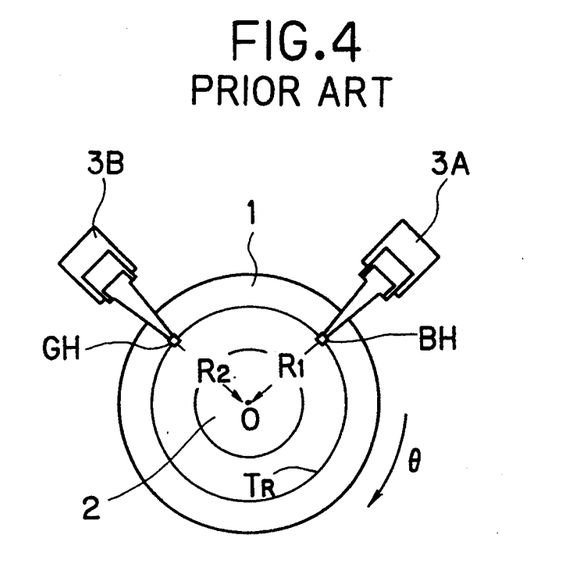
FIG. 4 illustrates a conventional glide tester which performs a burnish test as well as glide test simultaneously.

FIG. 4 shows a construction of a main portion of a glide tester which performs the burnishing step 3 as well as the glide testing step 4. Such glide tester is disclosed in Japanese Patent Application Laid-open No. Sho 63-175278. A magnetic disk 1 to be tested is mounted on a spindle 2 and rotated in a direction $\theta$. A pair of head positioners or head carriage mechanisms 3A and 3B are provided. The head carriage mechanisms 3A and 3B have arms pointing a rotation center O of the magnetic disk 1 with an angle therebetween. In FIG. 4, the angle is 90 degree. A burnishing head BH and a glide testing head GH are supported by end portions of the arms of the head carriage mechanisms 3A and 3B, respectively, and moved radially inwardly toward the rotation center O along radial lines R1 and R2, while keeping minute gaps with respect to a surface of the magnetic disk 1. Thus, the burnishing step 3 and the glide testing step 4 can be done with using the single device. In this case, it is possible to cause the burnishing head BH and the glide testing head GH to trace an identical track Tr so that the steps 3 and 4 are performed successively. Since, therefore, a result of burnishing can be known immediately by the following glide test, through-put of test process can be improved.

The certification testing step 5 may take a relatively long time. In order to reduce the test time, it is usual to divide a whole area of the magnetic disk radially to an inner region and an outer region and to perform the certification tests of the inner and outer portions in parallel by means of two certification testing heads supported on end portions of the head carriage mechanisms.

Figure 5:
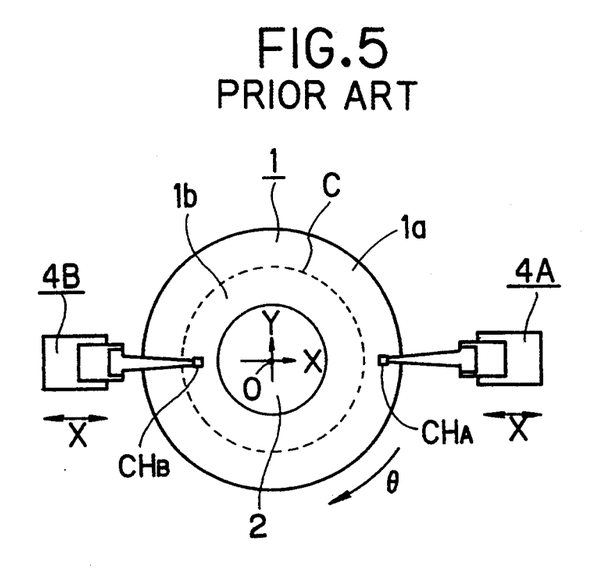
FIG. 5 illustrates a conventional parallel certifier.

FIG. 5 shows a main portion of such system which is disclosed in Japanese Patent Application Laid-open No. Sho 62-103581. In FIG. 5, a whole effective area of a magnetic disk 1 is divided radially by an imaginary circle C which is a center line of the whole area of thereof which can be used effectively as a magnetic recording medium to an inner region 1a and an outer region 1b and certification tests of these regions are performed in parallel simultaneously by certification testing heads CHa and CHb supported by head carriage mechanisms 4A and 4B which move within the regions 1a and 1b, respectively.

As to the formation of the magnetic film on the magnetic disk, it is a recent tendency to form it by sputtering or plating rather than painting. A magnetic film formed by sputtering or plating is generally high quality in term of flatness and, therefore, the glide step 2 may be omitted. Further, since an amount of particles to be scattered during the burnishing step 3 is very small, it becomes unnecessary to provide a separate room for the certification testing step 5.

Figure 6:
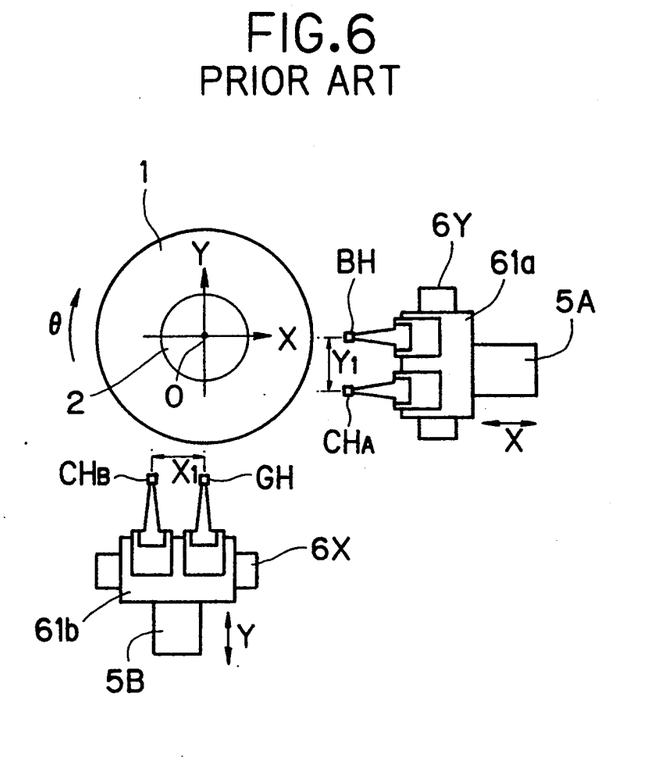
FIG. 6 shows a magnetic disk tester on which the present invention is based.

In a magnetic disk tester of this type, the steps 3 to 5 can be done by a single device and the parallel certification test is possible. FIG. 6 shows schematically a device of this type which is available from ProQuip, Inc., Santa Clara, Calif.

In FIG. 6, assuming a cartesian coordinates having an original point on a rotation center O of a spindle 2, a pair of head carriage mechanisms 5A and 5B which are movable in directions parallel to X and Y axes, respectively, are provided. A Y shifting mechanism 6y and an X shifting mechanism 6x are mounted on the head carriage mechanisms 5A and 5B, respectively. A head fixing plate 61a is fixedly secured onto a moving table of the Y shifting mechanism 6y, on which a burnishing head BH and a certification testing head CHa are mounted with a distance Y1 therebetween. Similarly, a head fixing plate 61b is fixedly secured onto a moving table of the X shifting mechanism 6x, on which a glide testing head GH and a certification testing head CHb are mounted with a distance X1 therebetween.

In operation, the burnishing head BH of the Y shifting mechanism 6y and the glide testing head GH of the X shifting mechanism 6x are positioned on lines passing through the original point O and moved by the head carriage mechanisms 5A and 5B in X and Y directions, respectively, to perform the burnishing step 3 and the glide testing step 4 in sequence repeatedly. When a result of the glide testing step 4 becomes acceptable, the certification testing head CHa on the Y shifting mechanism 6y is moved by the Y shifting mechanism 6y in Y direction by a distance Y1 and the certification testing head CHb on the X shifting mechanism 6x is moved by the X shifting mechanism 6x in X direction by a distance X1, so that the burnishing head BH and the glide testing head GH are switched by the certification testing heads CHa and CHb, respectively. Under this condition, the respective heads CHa and CHb are positioned on lines passing through the original point O and are moved in X and Y directions by means of the head carriage mechanisms 5A and 5B, respectively. Thus, the certification tests for the respective regions 1a and 1b separated as shown in FIG. 5 are performed.

For high density recording magnetic disk, the number of tracks is large and recording density is high. Further, there is a tendency that the higher the recording density of the magnetic disk makes the lower the test efficiency. Therefore, there is a strong request of user who is using the magnetic disk tester to improve the test efficiency. In order to satisfy the above mentioned request, the above mentioned heads must be positioned precisely at high speed. However, this is very difficult.

That is, since, in the case of the tester shown in FIG. 6, moment of inertia of the respective head carriage mechanism are large, it is impossible to position the heads precisely when the head carriage mechanisms are moved fast. On the contrary, when the positioning is made precise, the moving speed of the head carriage mechanisms is restricted necessarily, causing the test efficiency to be lowered.

In the tester shown in FIG. 6, the Y shifting mechanism 6y is mounted on the head carriage mechanism 5A and the X shifting mechanism 6x is mounted on the head carriage mechanism 5B. As a result, the moving direction of the head carriage mechanism becomes perpendicular to the shifting direction of the head. When the positioning of the head is made orthogonal to the moving direction of the head carriage mechanism, there may be errors produced in positioning of the head when it is moved at high speed. In addition to this problem, the construction of the shifting mechanism becomes complicated.

Further, when, in order to improve the test efficiency, the effective region of the magnetic disk is divided to a plurality of annular regions and certification tests are performed for the respective annular regions, there may a case where centers of the respective tracks in the respective divided regions as references are deviated due to positioning error to be occurred when the magnetic disk is a high recording density magnetic disk. Further, there is a risk that the centers of tracks in one region are different from those of other regions. With this, the quality certification to be given by the certifier for a high recording density magnetic disk is degraded.

SUMMARY OF THE INVENTION

When the recording density becomes higher, the size of magnetic head becomes smaller necessarily. Thus, a gap between the magnetic disk and various testing heads becomes smaller and leaf springs for supporting these testing heads become thinner. Therefore, it is not preferable, in order to position the testing head precisely at high speed, to move the head perpendicularly of the moving direction of the head carriage mechanism. That is, when the testing head is moved at high speed perpendicularly of the moving direction of the head carriage mechanism, the testing head may be easily vibrated in lateral direction, causing highly precise test to be impossible.

An object of the present invention is to provide a magnetic disk tester capable of testing a high density recording magnetic disk efficiently.

Another object of the present invention is to provide a magnetic disk tester with which it becomes possible to make reliable high density recording magnetic disks available for users.

In order to achieve the above objects, a magnetic disk tester according to the present invention is featured by that a first head moving mechanism mounting a first certification testing head and a burnish head arranged perpendicularly of a moving direction of the first head moving mechanism and a second head moving mechanism mounting a second certification testing head and a glide testing head arranged perpendicularly of a moving direction of the second head moving mechanism are provided and by that a switching between two heads on each head moving mechanism is performed by shifting a center of a spindle for supporting a magnetic disk perpendicularly of the moving direction of the heads.

According to the present invention, the magnetic disk tester comprises a spindle for supporting a magnetic disk, a spindle moving mechanism for reciprocally moving the spindle in a first, for example, Y, direction from a certain position by a constant distance Y1, a first head moving mechanism (for example, a carriage or head positioner) for fixedly mounting a burnishing head BH and a a first certification testing head CHa with a constant distance Y1 therebetween and moving these heads in a second, for example, X, direction perpendicular to the first direction reciprocally, and a second head moving mechanism provided symmetrically with the first head moving mechanism about the spindle for fixedly mounting a glide testing head GH and a second certification testing head CHb with a constant distance Y1 therebetween and reciprocally moving these heads in the second direction, wherein one of the two heads of each of the first and second head moving mechanisms is positioned at position on a radius of the magnetic disk on the spindle in an original position and the other of the two heads of each of the first and second head moving mechanisms is positioned at position on a radius of the magnetic disk on the spindle in a position shifted from the original position by the distance Y1.

In such tester as mentioned above, there is no need of mounting head moving mechanisms for switching the heads on each of the head moving mechanisms. Therefore, inertia of the moving portions of the head moving mechanisms is reduced allowing the heads to be moved precisely at high speed along the radius of the magnetic disk. Further, it is possible to mount the heads directly on the head moving mechanisms and, since the opposing heads of the head moving mechanisms are arranged symmetrically about the spindle, it is enough to position the heads mounted on the respective head moving mechanisms precisely with respect to the spindle and fix them in those positions. The preciseness can be maintained usually unless there are any unexpected special conditions. Therefore, positional deviation between the respective heads and the track is minimized.

For example, at the first position, the burnishing test and the glide test for the surface of the magnetic disk can be performed sequentially and repeatedly by arranging the burnishing head BH and the glide testing head GH in opposing relation to the spindle and moving the heads radially of the magnetic disk by means of the head moving mechanisms. After the glide test completes and when the spindle is shifted by Y1 by means of the spindle moving mechanism to the second position, the certification testing heads CHa and CHb become opposing to the spindle. Then, by moving the heads radially of the magnetic disk along the surface thereof by means of the head moving mechanisms to access divided regions of the effective area of the magnetic disk, certification tests for these regions can be performed in parallel, precisely.

In this tester, since the moving mechanism for switching the heads is performed by only the spindle moving mechanism, the whole mechanism of the tester itself becomes simple while making it possible to position the heads precisely. Further, since there is no movement of heads required for switching between them, there is no lateral vibration of the heads and it is possible to perform a precise test of a magnetic disk at high speed.

DESCRIPTION OF THE PREFERRED EMBODIMENTS

Figure 1A:
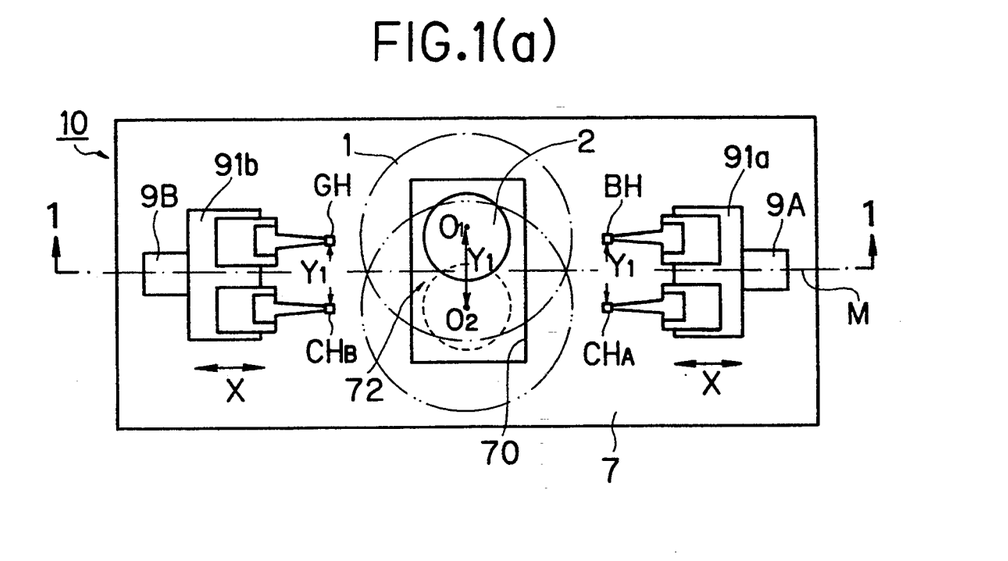
FIG. 1(a) is a plan view of a magnetic disk tester according to an embodiment of the present invention.
Figure 1B:
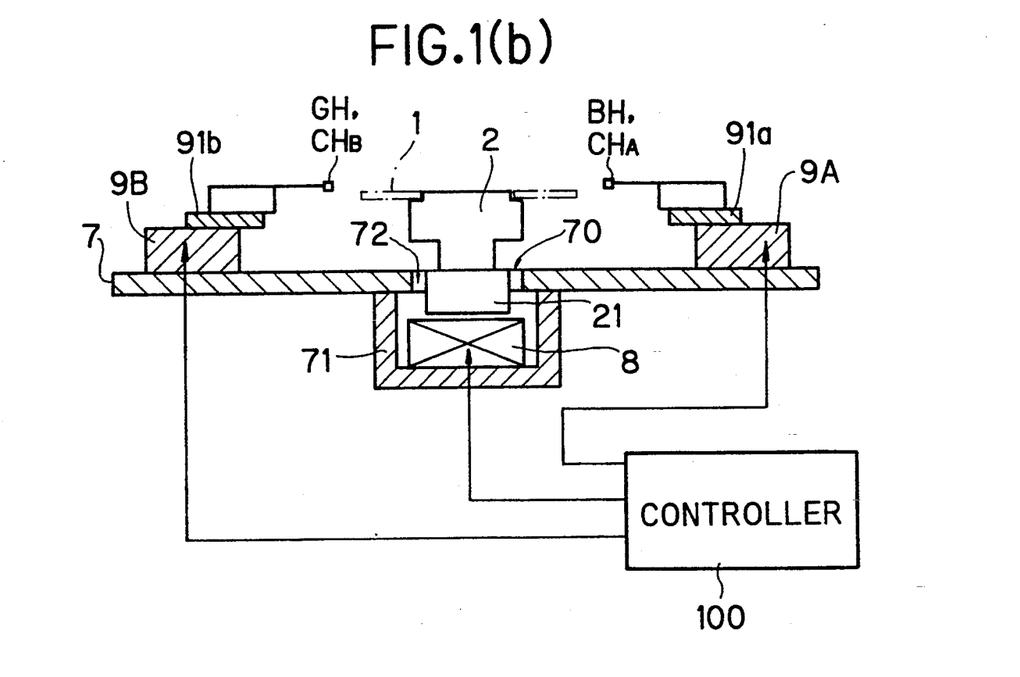
FIG. 1(b) is a cross section taken along a line I—I in FIG. 1(a)

In FIG. 1(a) which is a plan view of a magnetic disk tester according to an embodiment of the present invention and FIG. 1(b) which is a cross section taken along a line I—I in FIG. 1(a), a magnetic disk tester 10 includes a base portion 7 formed with a rectangular opening 70 in a center portion thereof, which is closed by a box shaped fixing member 71 attached to a rear surface of the base portion 7. On a bottom of a space defined by the box shaped fixing member 71 and a shoulder portion of the rectangular opening 70, a spindle shifting mechanism 8 is disposed on which a driving motor 21 is provided to drive a spindle 2 mounted thereon such that the latter protrudes upwardly from the rectangular opening 70.

An outer diameter of the driving motor 21 is smaller than a minor side dimension of the rectangular opening 70 so that gaps 72 are left on both sides thereof with respect to major sides of the opening 70 to assure a smooth movement of the driving motor 21 within the rectangular opening 70 in a direction parallel to the major side thereof.

The spindle 2 is provided with a chuck engageable with a center hole of the magnetic disk 1. Since such mechanism itself has no direct relation to the present invention, it is neither shown nor discribed here. The spindle 2 is adapted to reciprocate between a first position O1 and a second position O2 within the rectangular opening 70 by means of the spindle shifting mechanism 8. A distance between the first and second positions is Y1.

A pair of head carriage mechanisms 9A and 9B are fixedly arranged on a front surface of the base portion 7 substantially symmetrically about a rotation center of the spindle 2 such that a line segment M connecting centers of the head carriage mechanisms 9A and 9B intersects perpendicularly with a center line segment connecting the positions O1 and O2. The head carriage mechanism 9A has a moving table 91a on which a burnish head BH and a first certification testing head CHa are mounted fixedly and the head carriage mechanism 9B has a moving table 91b on which a glide testing head GH and a second certification testing head CHb are mounted fixedly, so that these heads are moved in X direction with movement of the moving tables 91a and 91b in X direction. The burnishing head BH and the first certification testing head CHa are arranged on the moving table 91a symmetrically about the line segment M with a distance Y1 therebetween and the glide testing head GH and the second certification testing head CHb are arranged on the moving table 91b symmetrically about the line segment M with a distance Y1 therebetween.

The distance Y1 is selected such that, when one of the two heads on one of the head carriage mechanisms 9A and 9B is moved radially inwardly of the magnetic disk 1 on its surface and reaches around the center hole thereof, the other head of the one head carriage mechanism becomes in the vicinity of an outer periphery of the magnetic disk.

Although an internal construction of the head carriage mechanism is not shown, it is well known that each head carriage mechanism includes an actuator such as voice-coil motor by which the moving table and hence the heads associated therewith are driven.

The reciprocal movement of the spindle 2 between the first position O1 and the second position O2 within an area defined by the rectangular opening 70 is restricted precisely by means of stopper mechanism provided in the spindle moving mechanism 8.

Figure 2:
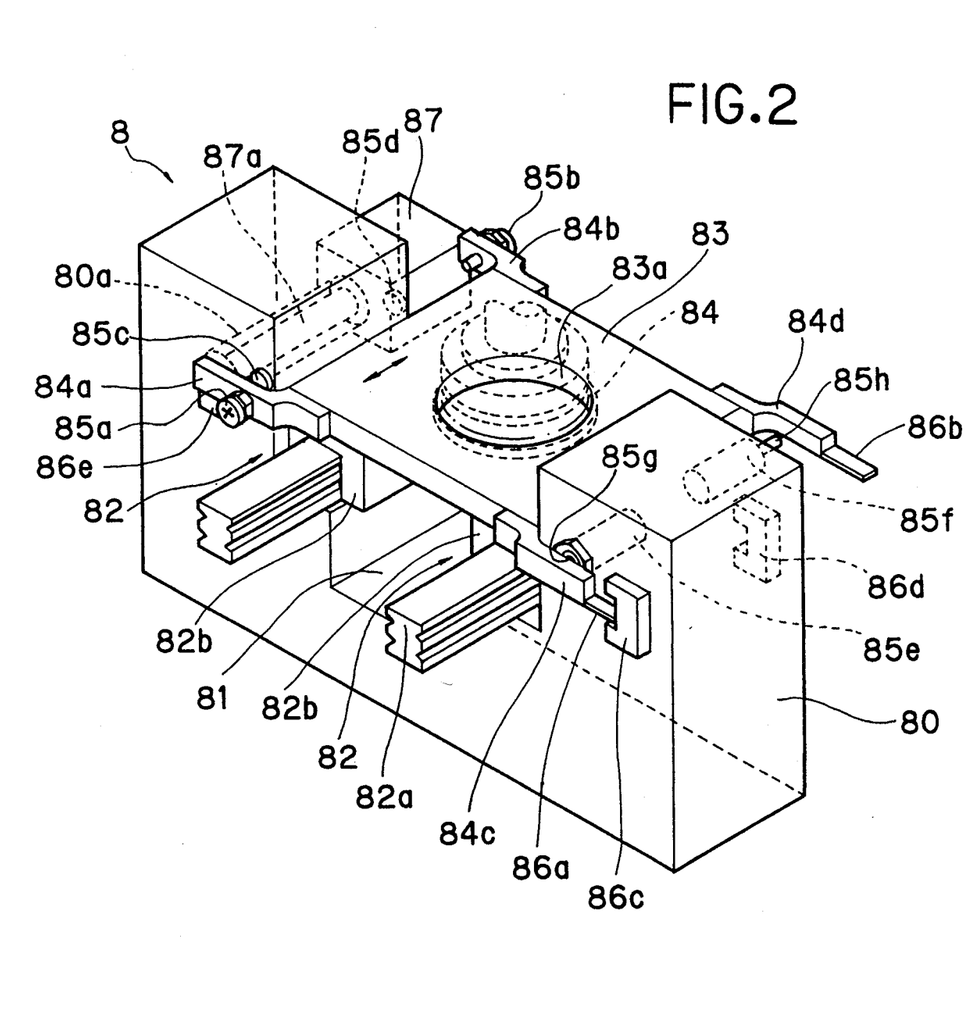
FIG. 2 is a perspective view of a spindle shifting mechanism according to the present invention.

FIG. 2 is a perspective view of the spindle moving mechanism 8. The spindle shifting mechanism 8 includes a relatively thick base block 80. The base block 80 is made generally U-shape by forming a stepped recess 81 having shoulders in a center portion thereof. On the shoulders, linear bearing mechanisms 82 are provided respectively. Each linear bearing mechanism 82 includes a guide rail 82a and a generally reverse-U shaped moving table 82b straddling the guide rail 82a. The guide rail 82a is formed in both side walls thereof with V-grooves and the shifting table 82b is also formed in both inside walls thereof with V-grooves. Bearings are provided within substantially square cylindrical spaces defined by the V-grooves of the guide rail 82a and the V-grooves of the moving table 82b.

A substantially square plate 83 for mounting a motor 21 is fixedly supported at both edges thereof by the moving tables 82b of the linear bearing mechanisms 82. The motor mounting plate 83 is formed at a center portion thereof with a circular opening 83a having diameter slightly larger than the outer diameter of the driving motor 21 shown by a dotted line so that the driving motor body can be inserted into the opening 83a of the motor mounting plate 83 and fixed thereto suitably. In this embodiment, the driving motor 21 is fixed to the opening 83a of the mounting plate 83 by finely regulating a position of the driving motor 21 such that the rotation center of the spindle 2 is aligned with a predetermined center position, fixedly supporting the driving motor body by a bracket ring member 84 shown by a dotted line and having a L-shaped cross section and fixing the bracket ring member 84 to a rear surface of the motor mounting plate 83 by such as screws through long slots formed in the bracket ring for positional regulation.

Arms 84a, 84b, 84c and 84d are fixedly provided at respective corners of the motor mounting plate 83. The arms 84a and 84c provided at the corners on a front side of the motor mounting plate 83 extend outwardly substantially in parallel to the side of the mounting plate 83 with a predetermined distance with respect to the side and the arms 84b and 84d provided at the corners on a rear side of the motor mounting plate 83 extend outwardly substantially in parallel to the rear side of the mounting plate 83 with a predetermined distance with respect to the rear side, so that the movement of the motor mounting plate 83 is restricted by contacts of the arms 84a and 84c with a front surface of the block 80 in one direction and by contact of the arms 84b and 84d with a rear surface of the block 80 in the other direction. The predetermined distance between the arm and the associated side of the motor mounting plate 83 in the center of its shift is a sum of $Y\frac{1}{2}$ and a minute distance for regulation. The arms 84a and 84b have regulation screws 85a and 85b implanted therein for regulating stop positions, respectively. Receiving seats 85c and 85d for receiving the the regulation screws 85a and 85b are formed in a front and rear surfaces of one leg portion of the base block 80, respectively. Within a front and rear surfaces of the other leg of the base block 80 opposing to the arms 84c and 84d, shock absorbers 85e and 85f having pins 85g and 85h are formed, with the pins protruding from these surfaces, respectively. Further, plates 86a and 86b are mounted on free end portions of the arms 84c and 84d, respectively, to block light paths of photo-interrupters 86c and 86d provided on a front and rear surfaces of the other leg of the base block 80, respectively. The photo-interrupters may be replaced by other photo-sensors.

An air-cylinder 87 is fixedly mounted on the rear surface of the one leg of the base block 80 associated with the arm 84b. A piston rod 87a of the air-cylinder 87 passes through a through-hole 80a formed in the one leg of the base block 80 and is extendable from the front surface of the one leg. A bracket 86e is mounted on a free end of the arm 84a which covers an opening of the through-hole 80a of the base block 80. A free end of the piston rod 87a is fixedly secured to the bracket 86e, so that, when the air-cylinder 87 is actuated, the piston rod 87a is moved to move the arm 84a. A reciprocal movement of the arm 84a is transmitted to the motor mounting plate 83, so that the driving motor 21 on the motor mounting plate 83 is reciprocated within the distance Y1.

With this reciprocation of the motor mounting plate 83, one of the regulation screws 85a and 85b provided on the arms 84a and 84b collides with one of the receiving seats 85c and 85d to limit the position of the spindle 2 to a predetermined position precisely. That is, the positional regulation for precisely determining the position of the rotation center of the spindle 2 at the point O1 and O2 is performed by regulating the stop position regulating screws 85a and 85b. Further, the base block 80 itself is precisely positioned with respect to the base member 7 such that the rotation center of the spindle 2 is set at a predetermined reference position on the base member 7 and then mounted on the fixing member 71 shown in FIG. 1(b).

Although, in this embodiment, the shift of the driving motor 21 of the spindle shifting mechanism 8 and hence the spindle 2 by the distance Y1 is realized by means of the air-cylinder 87, other actuators may be used therefor instead of the air-cylinder. For example, the spindle 2 may be shifted by means of a combination of a driving mechanism such as motor and a slider-crank mechanism or a combination of a directly driven cam and a link mechanism. In such case, however, it may be necessary to provide a mechanism for precisely positioning the rotation center of the spindle 2 at the point O1 and O2 at high speed and for reciprocating it between these points.

A reference numeral 100 in FIG. 1(b) depicts a controller for controlling a switch-over valve of the air-cylinder 87 to drive the spindle shifting mechanism 8 so that the rotation center of the spindle 2 is positioned at the point O1 and O2 and is reciprocated therebetween. The controller 100 also controls driving of the head carriage mechanisms 9A and 9B to move the respective heads to the magnetic disk 1 or return them to the state shown in FIG. 1(a).

In operation, when the rotation center of the spindle 2 of the tester 10 is at the point O1 (first position), the magnetic disk 1 mounted on the spindle 2 for test takes in the position shown by a chain line in FIG. 1(a). The burnishing and glide testing are performed sequentially and repeatingly by moving the burnishing head BH and the glide head GH along the surface of the magnetic disk 1 radially in X direction by means of the respective head carriage mechanisms 9A and 9B under control of the controller 100 to trace the same track Tr as in the same manner shown in FIG. 4 or 6.

When a result of the glide test is acceptable, the burnishing head BH and the glide head GH are retracted and then the spindle 2 is shifted by the distance Y1 by means of the shifting mechanism 8 under control of the controller 100 to set the rotation center thereof at the point O2 (second position). Thus, the position of the magnetic disk 1 becomes a position shown by a double chain line in FIG. 1(a). The head carriage mechanisms 9A and 9B are controlled by the controller 100 to move the certification testing heads CHa and CHb along the surface of the magnetic disk 1 radially to thereby perform the certification tests for the respective regions separated by the center line C shown in FIG. 5 in parallel.

What is claimed is:

1. A magnetic disk tester, comprising:
   a spindle for mounting a magnetic disk;
   a burnishing head, a glide testing head and first and second certification testing heads used on a surface of the disk;
   a first head moving mechanism on which said first head and said burnishing head are fixedly mounted for moving said first head and said burnishing head in a first radial direction with respect to said disk, said first head and said burnishing head being arranged perpendicularly of said first radial moving direction;
   a second head moving mechanism on which said second head and said glide testing head are fixedly mounted for moving said second head and said glide testing head in a second radial direction with respect to said disk, wherein said second head and said glide testing head are arranged perpendicularly of said second radial moving direction;

means for moving said spindle between opposite positions in a direction perpendicular to the first and second radial moving directions, wherein when said spindle is moved with said spindle moving means between said opposite positions, operative positions on the surface of said disk of said burnishing head and said glide testing head are switched with said first head and said second head, respectively.

2. The magnetic disk tester claimed in claim 1, further comprising said spindle moving means being a spindle shifting mechanism for reciprocating said spindle within a constant distance between said opposite positions and wherein said first and second head moving mechanisms are head positioners arranged in opposing relation to each other about said spindle.

3. The magnetic disk tester claimed in claim 2, wherein said heads of each of said first and second head moving mechanisms are arranged in parallel to each other with a distance equal to said constant distance therebetween and wherein said spindle shifting mechanism includes a plate for moving a motor having a shaft coupled to said spindle by a distance equal to said constant distance and said constant distance is determined by making a member coupled to said plate in contact with a base or a member coupled to said base.

4. The magnetic disk tester claimed in claim 3, wherein each said head moving mechanism comprises a head carriage mechanism and wherein said spindle shifting mechanism is arranged below said base and said spindle protrudes upwardly through an opening portion provided in said base.

5. A magnetic disk tester, comprising:
a spindle for mounting a magnetic disk;
a burnishing head, a glide testing head and first and second certification testing heads used on a surface of the disk;
a spindle shifting mechanism for moving said spindle between opposed first and second positions by a constant distance along a first direction;
a first head moving mechanism on which said first testing head and said burnishing head are fixedly mounted for moving said first head and said burnishing head in a second direction orthogonal to said first direction, said first head and said burnishing head being arranged on said first head moving mechanism with a distance equal to said constant distance therebetween; and
a second head moving mechanism on which said second head and said glide testing head are fixedly mounted for moving said second testing head and said glide testing head in said second direction, said second testing head and said glide testing head being arranged on said second head moving mechanism with a distance equal to said constant distance therebetween;
wherein said spindle shifting mechanism shifts said spindle back and forth between said opposed positions along said first direction so that operative positions on the surface of said disk of said burnishing head and said glide testing head are switched with said first testing head and said second head, respectively.

6. The magnetic disk tester claimed in claim 5, wherein opposing ones of said two heads on said first and second head moving mechanisms are on radial lines of said magnetic disk when said spindle is in one of said opposed positions and the other of said two heads on said first and second head moving mechanisms which oppose each other are on radial lines of said magnetic disk when said spindle is in the other of said positions, shifted from said one position by said constant distance.

7. The magnetic disk tester claimed in claim 6, wherein said first and second head moving mechanisms comprise head positioners, said spindle is coupled to a motor shaft, said motor is fixed to a shifting table of said spindle shifting mechanism, said spindle shifting mechanism and said pair of head positioners are fixed to a base or a member coupled to said base.

8. A magnetic disk tester, comprising:
a spindle for mounting a magnetic disk;
a spindle shifting mechanism for moving said spindle along a first line between opposed first and second positions by a constant distance in one direction;
a first head moving mechanism and a second head moving mechanism arranged along a second line in a second direction perpendicularly intersecting said one direction at an intermediate position between said first and second positions substantially symmetrically about said spindle;
a burnishing head and a first certification testing head mounted parallel to one another on one of said first and second head moving mechanisms symmetrically about said first line with a distance of substantially one-half of said constant distance therebetween; and a glide testing head and a second certification testing head mounted in parallel with one another on the other of said first and second head moving mechanisms in opposing symmetrical relationship with said burnished head and said first certification testing head with respect to said second line, wherein when said spindle is moved with said spindle shifting mechanism between said opposite first and second positions, operative positions on a surface of said disk of said burnishing head and said glide testing head are switched with said first head and said second head, respectively.

* * * * *